Aug. 10, 1943.  W. A. ROSS  2,326,684
DOLLY
Filed June 6, 1942   3 Sheets-Sheet 1

INVENTOR.
William A. Ross
By: Walter M. Fuller
Atty.

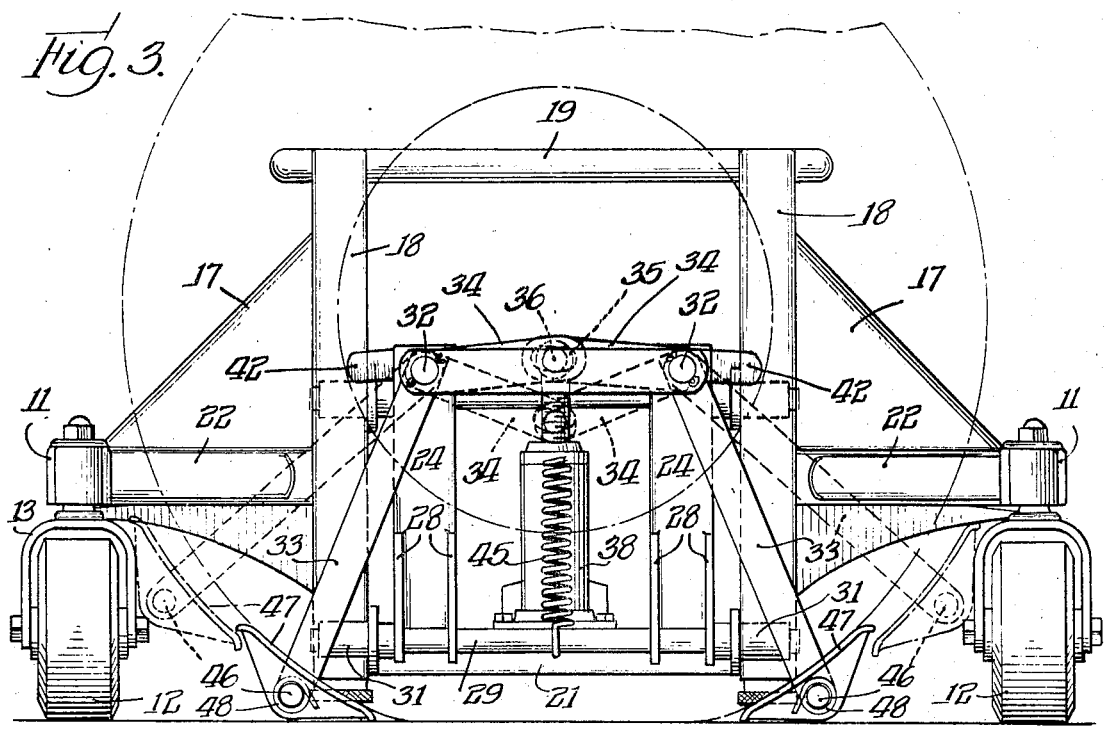
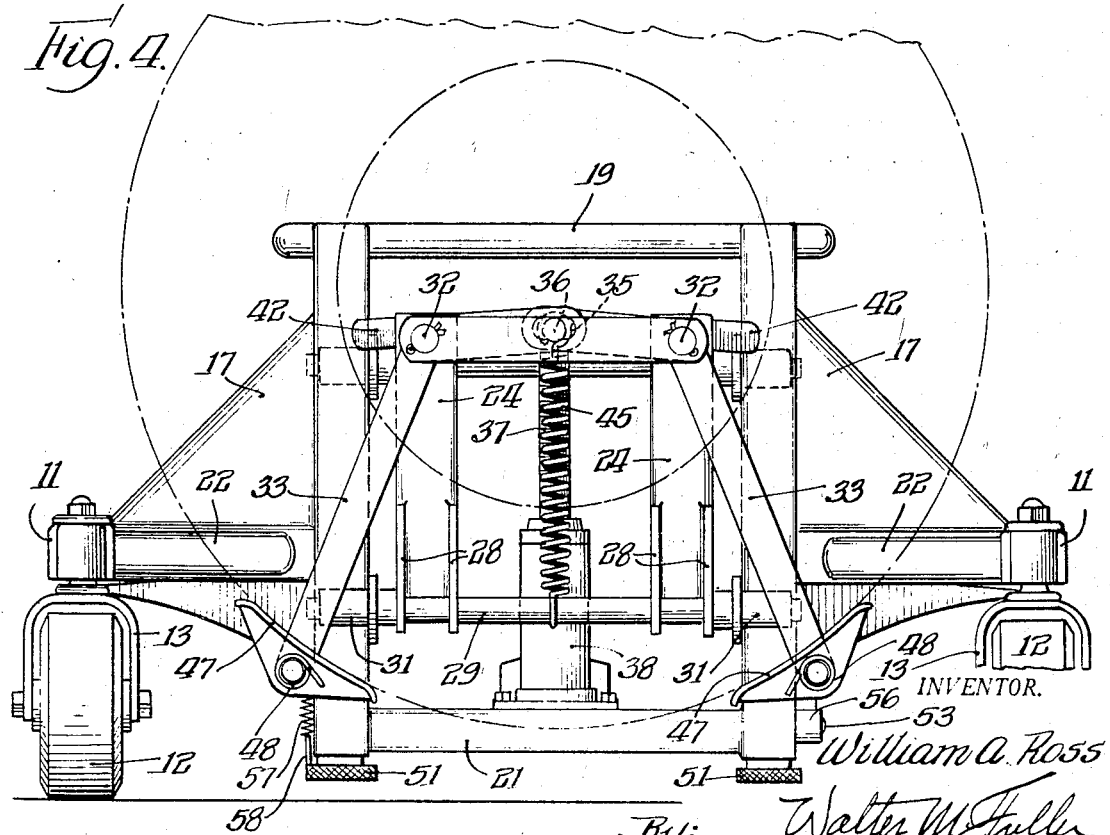

Aug. 10, 1943.    W. A. ROSS    2,326,684
DOLLY
Filed June 6, 1942    3 Sheets-Sheet 3
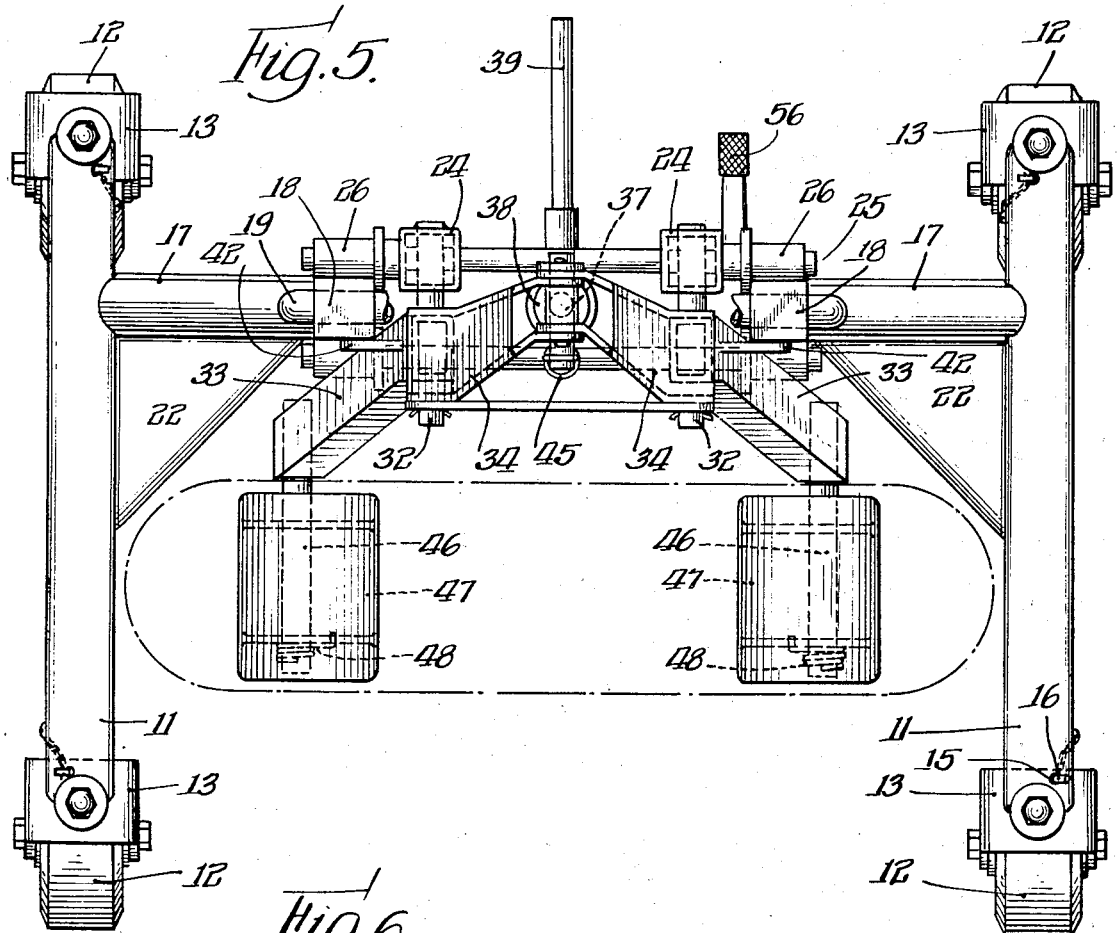
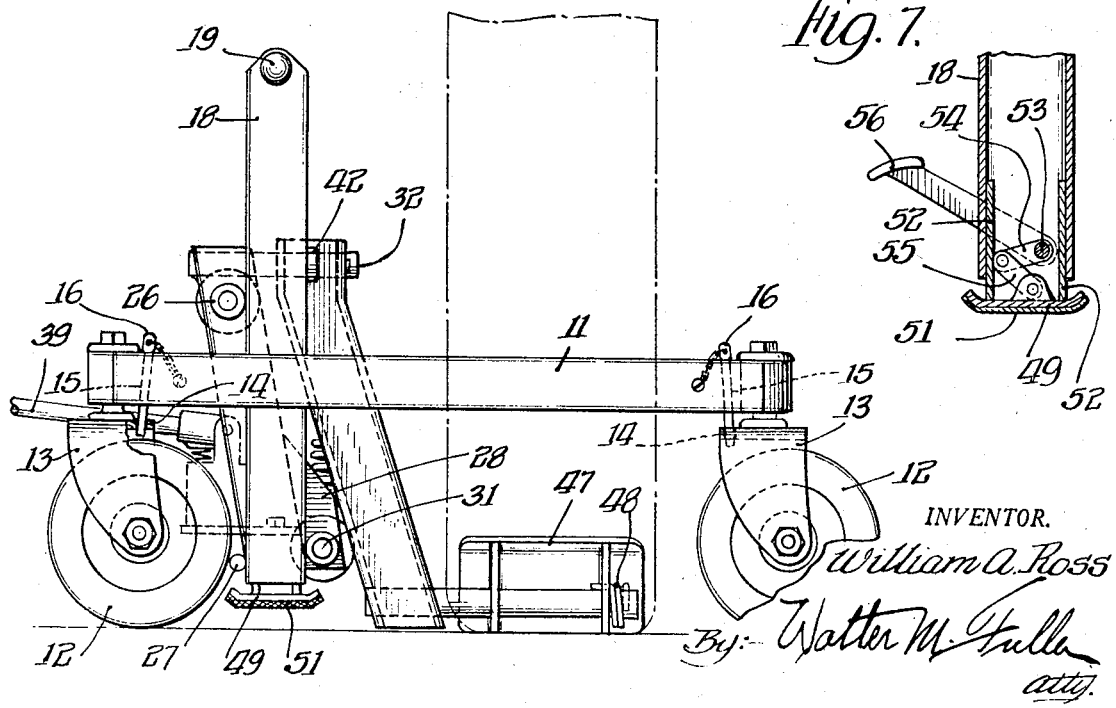
INVENTOR.
William A. Ross
By: Walter M. Fuller
atty.

Patented Aug. 10, 1943

2,326,684

UNITED STATES PATENT OFFICE 2,326,684

DOLLY

William A. Ross, Springfield, Ill., assignor to Weaver Manufacturing Company, Springfield, Ill., a corporation of Illinois Application June 6, 1942, Serial No. 446,053

10 Claims. (Cl. 214—65.4)

The current invention relates to dollies and comparable appliances and more particularly concerns structural and functional betterments in dollies used for parking airplanes, for raising automobiles or trucks by means of their wheels, or for facilitating the removal and replacement of wheels of a vehicle of any type.

The following description deals more especially with dollies for the parking of airplanes, but, of course, as indicated, the invention is susceptible of embodiments in appliances adapted for other or analogous purposes.

One outstanding aim of the invention is to provide novel and efficient means for carrying part of, or the complete weight of, an airplane on two or more parking dollies, to enable the plane to be moved in any direction over the ground or surface on which it rests, as in a hangar.

Inasmuch as each of the two landing-wheels of an airplane is in a fixed mounting so far as its capacity for pivoting about a vertical axis is concerned, and further, since it is often required to move the airplane in a direction transverse, or partially so, to the plane of rotation of said landing-wheels, it is desirable to provide means for carrying the weight of the airplane on separate dollies, which may be moved in any direction over the ground or other surface on which the airplane rests.

There are two general types of landing-gear in use on airplanes: the conventional style, consisting of a pair of landing-wheels and a tail-wheel, the latter being pivoted about a vertical axis in the manner of a caster-wheel, so that it may swivel about its vertical axis in a more or less limited amount; the other type being the so-called tricycle landing-gear, composed of two main landing-wheels and a nose-wheel, which latter is also mounted to caster about a vertical axis in a somewhat restricted degree.

In general, if the weight of the airplane can be removed from the two main landing-wheels and transferred to a pair of parking dollies of the character incorporating this invention, the airplane can be moved in any direction, since the tail-wheel or the nose-wheel, as the case may be, will pivot a sufficient amount to permit of such universal directional movement, or, on smaller airplanes, the weight on the tail-wheel or nose-wheel can be supported by one or two men.

Should the tail-wheel or nose-wheel on a heavier plane not swivel sufficiently to permit of the desired direction of movement of the airplane over the surface on which it rests, a third dolly can be used in supporting the weight resting on such wheel.

To enable those skilled in this art to understand the present invention fully from various aspects, a present, preferred embodiment thereof in a single dolly has been illustrated in the accompanying drawings, forming part of this specification, and to which reference should be had in connection with the following detailed description, and, for simplicity, like reference-numerals have been employed throughout the several views to designate the same structural parts of the appliance.

In these drawings:

Figure 3 is a front elevation of the dolly showing the wheel-engaging shoes in dotted lines in inoperative positions and in full lines in contact with the wheel ready for lifting the same;

Figure 4 is a view like that of Figure 3, but illustrating the parts in their elevated relation;

Figure 5 is a plan view of the dolly;

Figure 6 is an end view of the same; and

Figure 7 is a fragmentary section showing one of the brake-shoes and its operating means.

Figure 1:
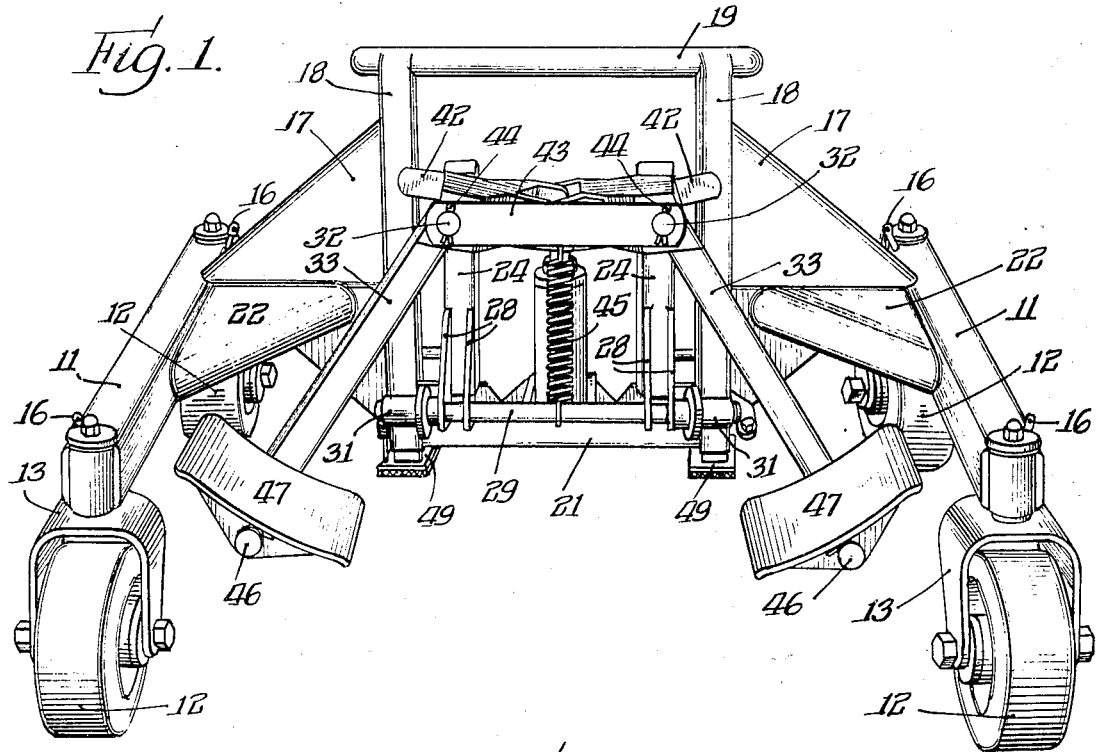
Figure 1 is a front perspective view of the novel apparatus.

Referring to these drawings, it will be noted that the main metal-frame of the dolly includes two, horizontal, hollow, forwardly and rearwardly extended arms or bars 11, 11 supported at their opposite ends on four, appropriately-mounted caster-wheels 12, 12, 12, 12, and, since sometimes it is desirable to maintain such caster-wheels in fixed relation to the frame, that is parallel to the arms or bars 11—11, or in some angular relation thereto, the mounting 13 for each such wheel at its top has a hole 14 (Fig. 6) and the corresponding frame arm or bar 11 has a hole 15 in register with hole 14 when such parallelism exists, the aligned holes being adapted to accommodate a removable lock-pin 16.

As is clearly illustrated, the rear sections of the two side-bars 11, 11 are cross-connected together by a frame-structure, characterized as a whole 17, and including a pair of spaced-apart, upright, hollow bars 18, 18 joined together at their tops by a horizontal handle 19 and connected together at their bottoms by a cross-bar 21, these elements defining and providing a centrally-located, rectangular opening, such cross-frame 17 and the two bars 11, 11 being strengthened by horizontal, metal, triangular, hollow braces 22, 22 (Figs. 4 and 5), all of these parts being desirably joined together in the relations shown and described by welding.

Figure 2:
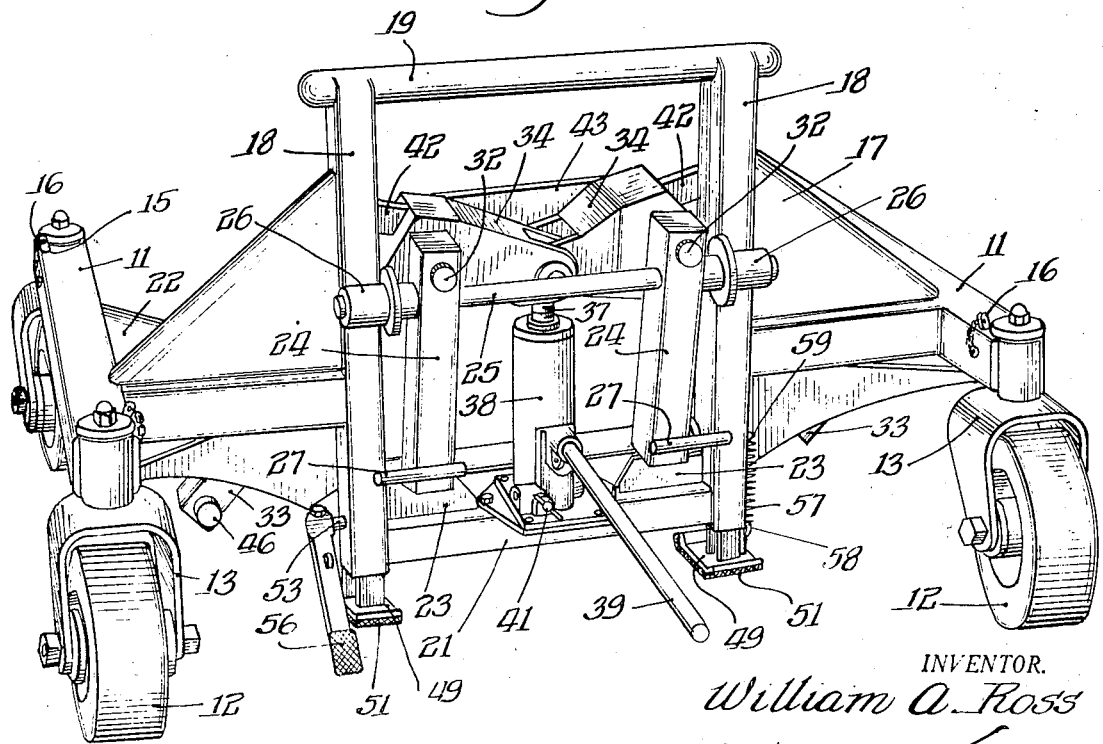
Figure 2 is a rear perspective view of the same.

Also, the elements 18, 18 and 21 may be further strengthened and stiffened by braces 23, 23 welded thereto, as shown in Figure 2.

Movable up and down in the opening of the transverse-frame 17 is a vertically-slidable frame structure or carriage, comprising a pair of parallel, hollow bars 24, 24, square in cross-section, and maintained in the specified relation to one another by a rod 25 extended through aligned holes in the parts 24, 24 and welded to the latter, the protruding ends of the rod having revoluble thereon a pair of flanged, anti-friction guide-rollers 26, 26, each bearing on and coacting with two surfaces of the corresponding bar 18.

At the rear face of the lower portion of each bar 24 there is welded thereto a short guide-rod 27 (Fig. 2) overlapping and slidable on the back surface of the adjacent bar 18.

At the front of the cross-frame 17, the lower parts of the bars 24, 24 are provided with extension-plates 28, 28 welded thereto (Figs. 1, 3, 4 and 6), and these plates are apertured in register and receive a horizontal rod 29 which is welded to the plates 28, 28, the extended ends of such shaft having revolubly-mounted thereon flanged guide-rollers 31, 31 coacting with the corresponding faces of the associated elements 18, 18.

The upper portions of such bars, 24, 24 have fixedly mounted therein, as by welding, a pair of parallel, horizontal, forwardly - projecting shafts 32, 32 and the front parts of such shafts have rockingly mounted thereon the elbows of two, hollow, bell-crank levers 33, 33, the oppositely-disposed, overlapping, short arms 34, 34 of which are slotted at 35 to receive a pin 36 engaged on its under side by the plunger 37 of a manually-operable, upright hydraulic-jack 38 of known or ordinary type supported on the base 21 and having a rearwardly-extended actuating-handle 39 and a release or relief valve 41 and its usual handle.

To assist in guiding the parts in their movements, each such bell-crank lever 33 has a lip 42 welded thereto and overlapping the front surface of the correlative frame-member 18.

The extreme front ends of the stud-shafts 32, 32 are connected together by a link 43 apertured to accommodate the shafts and held thereon by cotter-pins 44, 44.

A coiled, contractile-spring 45 has its top end hooked over the shaft or pin 36 and its lower end hooked beneath shaft or rod 29.

Each of the lower end portions of the long arms of the bell-crank levers 33 is supplied with a forwardly-directed stud-shaft 46 on which one of the pair of oppositely-disposed concave-shoes 47 is rockingly mounted, a short spring 48 (Figs. 3, 4 and 5) coiled around the shaft and having one end secured thereto and the other end passing through a hole in the shoe, yieldingly maintaining the shoe in a normal angular position from which it may be automatically rocked or shifted in either direction as it engages the tread of the wheel-tire.

The dolly is also equipped with a pair of brakes, one associated with each of the hollow uprights 18, each such brake comprising a relatively-flat metal-foot 49 (Fig. 7) whose bottom surface is covered with suitable friction-material 51, the foot or shoe having upstanding guides 52 slidable inside of the corresponding open-end of the hollow frame-member 18.

The means for simultaneously depressing the brake-feet to engage the floor, ship-deck, or other surface, includes a shaft 53 extended through bearings in the walls of the parts 18, 18 with an arm 54 fixed to the shaft for each foot and a link 55 operatively connecting each such arm to the foot or shoe, an external portion of the shaft 53 having an operating-pedal 56 (Fig. 2), the two brake shoes or feet being normally held in elevated, inoperative position by a contractile-spring 57 secured at its lower end at 58 to such foot and at its upper end to a pin 59 mounted on the outer side of the adjoining frame-member 18, as illustrated in Figure 2.

The novel dolly is brought to proper position with relation to the airplane landing-wheel with which it is to be associated by rolling the dolly bodily by grasping the handle 19 so that its front directly faces the side of the wheel, and, then with the pair of contact-shoes in their normal spread or open positions due to the action of spring 45, so as not to interfere with the wheel, the dolly is advanced until its shoes 47, 47 are in the plane of the landing-wheel to be lifted, the caster-wheel-equipped frame-bars 11, 11 of course, straddling the wheel.

Thereupon, the jack-handle 39 is operated to elevate the jack-plunger 37, and, as this ascends, due to its engagement with the rod 36, the short arms 34, 34 of the two bell-cranks 33, 33 are rocked upwardly against the action of spring 45, which is thus elongated, and the longer arms of the bell-cranks swing inwardly toward one another until their curved, rockingly-adjustable shoes engage the under portion of the wheel-tire which precludes their further approach toward one another.

In this connection, it is to be borne in mind that the spring is not strong enough, even though elongated, to lift the slidable carriage on which the bell-crank levers are mounted.

Continued operation of the jack 38 by its handle 39, after the shoes have properly engaged the tire-tread, causes the whole upwardly-slidable frame or carriage carrying the bell-crank arms and their shoes to ascend to a proper height, thus elevating the airplane landing-wheel from the ground or floor, and, after both landing-wheels are thus raised, each by its own dolly, the airplane can ordinarily be readily parked with facility by reason of the caster-wheel characteristics of both of the dollies.

Obviously, if a third dolly should be needed for the third wheel of the airplane, it could also be employed.

When conditions are such that the airplane is to be lowered so that it is no longer supported by the dollies, the relief-valve 41 in each jack is opened to allow the liquid in the jack below its plunger or piston to flow therefrom into the space above the piston or plunger as is common practice.

So long as the weight of the airplane is imposed on the supporting shoes 47, 47 and the bell-crank levers 33, 33, such weight acts to depress the jack-plunger, and, after such weight is removed from the plunger by the wheel engaging and being supported by the ground or floor, the contraction of the expanded spring 45 pulls the plunger down to its lowest point, and, during such spring-contraction, the bell-crank levers and their shoes separate to their original positions ready for easy retraction of the dolly sidewise of the landed wheel.

It should be noted that the shaft 29 to which the lower end of spring 45 is attached forms part of the upwardly slidable carriage, and, as soon as the latter initiates its upward travel, whereas the original expansion of the spring is maintained, it is not increased and contraction of the expanded spring does not start until the wheel is again deposited on the ground or floor.

The strength of spring 45 is so chosen that it will support the weight of the bell-crank levers and their shoes in the dotted line positions shown in Figure 3, but in its most expanded condition, it is not strong enough to lift the weight of the entire lifting carriage.

The braking feature of the dolly is usually essential when the appliance is used on shipboard for parking the airplanes on an airplane-carrier, since as the ship rolls and pitches due to the action of the waves on the vessel, if the dolly is not locked to the deck in some way, it will roll over the deck out of control.

To put the brakes in action, the operator depresses the pedal 53. which rocks shaft 53 and turns the two arms 54 downwardly until they and their associated links 55, which constitute toggles, pass slightly beyond dead-center in which relation they automatically remain locked with the brake-shoes in engagement with the floor or deck, thus lifting the two rear wheels of the dolly off the deck, ground or floor, which condition remains until the operator by means of the pedal breaks or terminates such locked condition of the toggles, allowing the brake feet or shoes to rise under the contracting action of spring 57.

Those skilled and trained in this art will readily understand that the invention is not limited and confined to the exact and precise details illustrated and described and that various changes and modifications in the structure may be resorted to without departure from the heart and essence of the invention as defined in the appended claims and without the loss or sacrifice of any of its material benefits and advantages.

I claim:

1. In a dolly of known type having a frame, carrying-wheels supporting said frame, a pair of oppositely-facing shoes, and means mounting said shoes on said frame (a) for their contraction toward one another in the plane of a vehicle-wheel to engage opposite lower portions of the tread of the wheel while the latter is supported on the ground or floor and for their expansion from one another to release the wheel, and (b) for elevation and lowering of said shoes while supporting said wheel, the novel combination of means normally maintaining said shoes in their expanded relation, and a single operating-means on said frame when actuated first producing said contraction of said shoes in the plane of the wheel into said engagement with the wheel-tread and then said elevation of said shoes and the raising of said wheel while supported by the shoes, the weight of said wheel and its load thereon lowering said shoes and wheel when permitted to do so by said operating-means, said shoe-expanding means automatically producing said expansion of said shoes and thus releasing said wheel subsequent to the landing of said wheel on the ground or floor.

2. The novel combination of means in a dolly set forth in claim 1, in which said shoe-expanding means is a spring, the action of which is overcome by said operating-means during said initial contraction of the shoes.

3. The novel combination of means in a dolly set forth in claim 1, in which said operating-means includes a manually-actuated hydraulic-jack with the usual plunger and relief-valve.

4. The novel combination of means in a dolly set forth in claim 1, in which said shoe-expanding means is a spring, in which said operating-means includes a manually-actuated hydraulic-jack with the usual plunger and relief-valve, in which the initial lifting movement of said plunger overcomes the action of said shoe-expanding spring, and in which said spring depresses said plunger after the relief-valve has been opened and after the wheel has landed on the ground or floor.

5. In a dolly of known type having a frame, carrying-wheels supporting said frame, a pair of oppositely-facing shoes, and means mounting said shoes on said frame (a) for their contraction toward one another in the plane of a vehicle-wheel to engage opposite lower portions of the tread of the wheel while the latter is supported on the ground or floor and for their expansion from one another to release the wheel, and (b) for elevation and lowering of said shoes while supporting said wheel, the incorporated, combined, novel features being (a) that said shoe-mounting means includes a carriage movable up and down on said frame, (b) a pair of bell-crank levers fulcrumed on said carriage each with one of its arms extended downwardly, said shoes being oppositely disposed on said arms of said bell-crank levers, (c) means tending to maintain said downwardly-directed arms of said bell-crank levers and said shoes in expanded condition to permit the dolly to be positioned with the expanded shoes in the plane of the wheel, and (d) an hydraulic-jack with the usual plunger and relief-valve on said frame and with the plunger of the jack operatively associated with the other arms of said bell-crank levers, said jack when operated first producing the contraction of said shoes into said engagement with the wheel-tread and then producing the elevation of the shoes and wheel while the latter is supported by the shoes, the weight of the elevated wheel and its load thereon causing said jack-plunger, carriage, bell-crank levers and shoes to descend and deposit the wheel on the ground or floor when said jack relief-valve is opened to allow descent of its plunger, said shoe-expanding means then causing further descent of the jack-plunger and said expansion of said shoes and said release of said wheel therefrom ready for removal of the dolly from the plane of the wheel.

6. The novel features in a dolly set forth in claim 5, in which said shoe-expanding means is a spring connected to said bell-crank levers and to said carriage.

7. The novel features in a dolly set forth in claim 5, in which said carriage is slidably mounted on said frame.

8. The novel features in a dolly set forth in claim 5, in which said carriage is slidably mounted on said frame and in which said shoe-expanding means is a spring connected to said bell-crank levers and to said carriage.

9. The novel combination of means in a dolly set forth in claim 1, in which said carrying-wheels are caster-wheels in combination with means to releasably lock one or more of said caster-wheels against swivelling.

10. The novel features in a dolly set forth in claim 5, in which said carrying-wheels are caster-wheels in combination with means to releasably lock one or more of said caster-wheels against swivelling.

WILLIAM A. ROSS.